Figure 1:
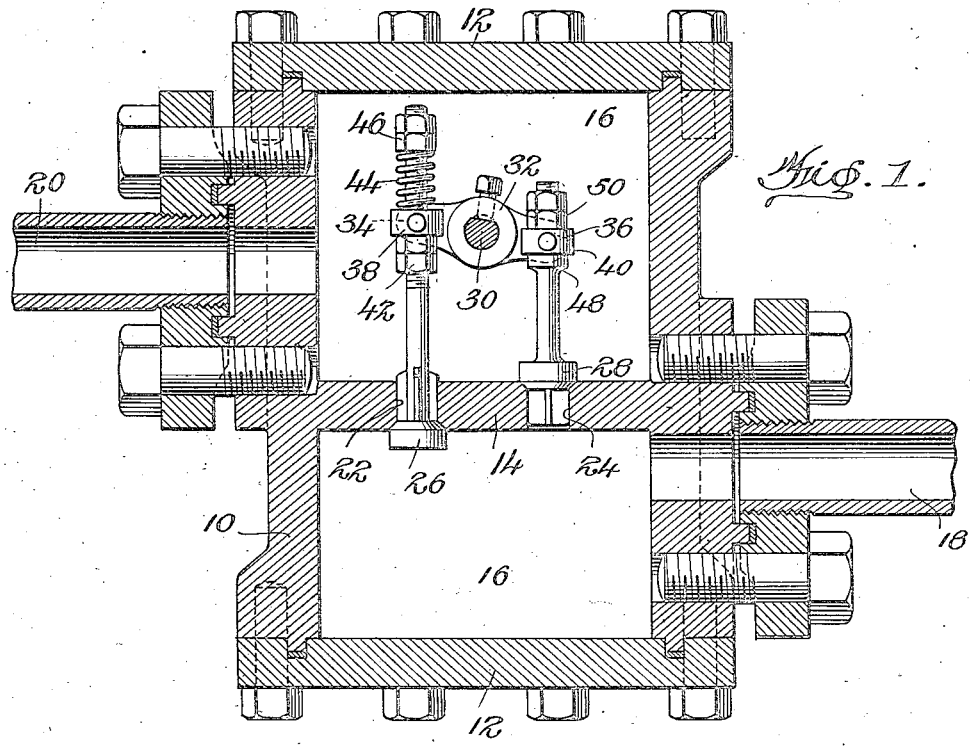

March 18, 1930.  G. D. REINHARDT  1,751,172
VALVE AND VALVE OPERATING MECHANISM
Filed Aug. 6, 1927  2 Sheets-Sheet 1

Inventor
George D. Reinhardt,
by Bright & Bailey
Attorney

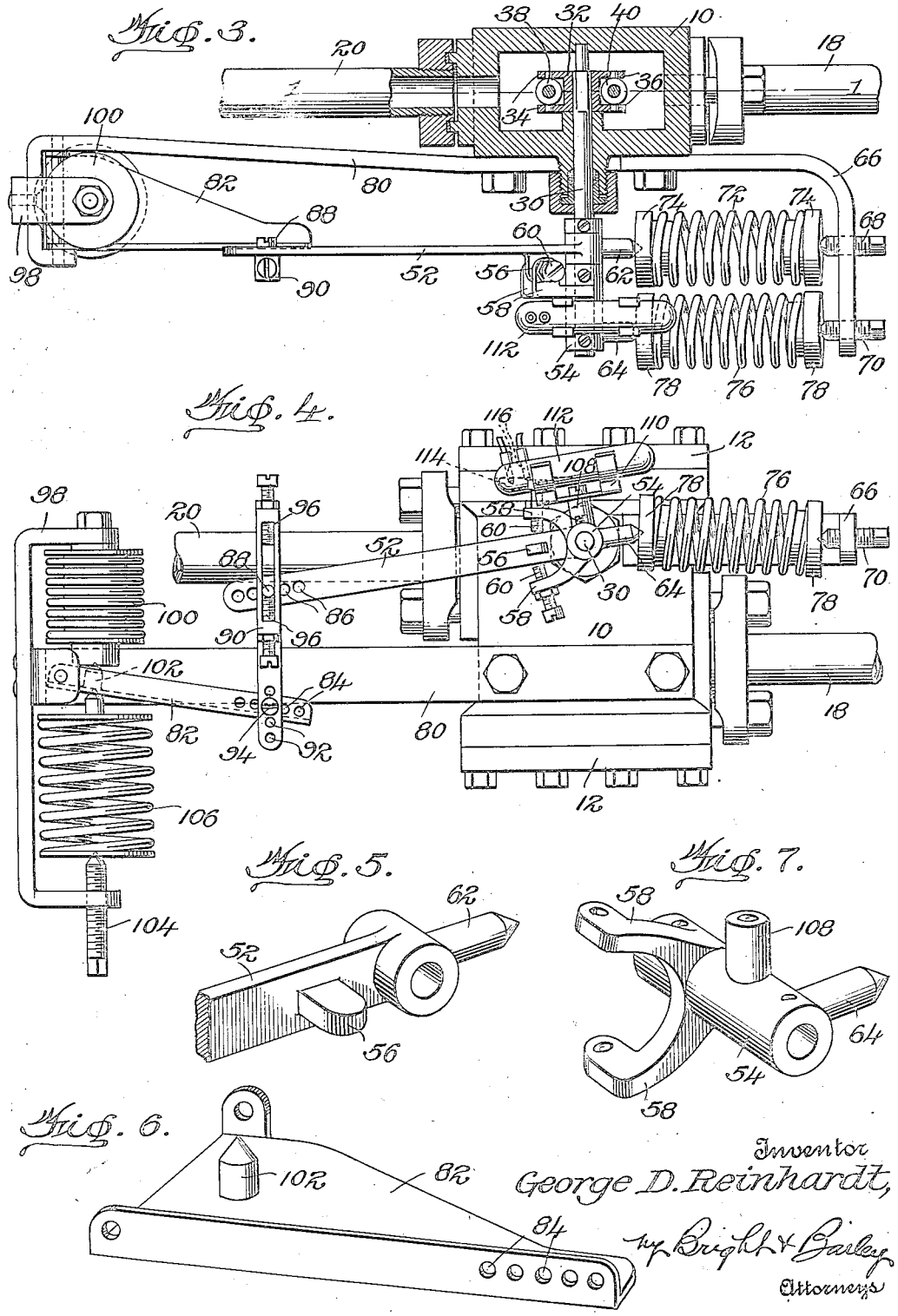

Patented Mar. 18, 1930

1,751,172

UNITED STATES PATENT OFFICE

GEORGE D. REINHARDT, OF DALLAS, TEXAS

VALVE AND VALVE-OPERATING MECHANISM

Application filed August 6, 1927. Serial No. 211,134.

My invention relates to valves and to valve actuating mechanisms, and my purpose, generally speaking, is to provide on the one hand an improved valve of the balanced type which is durable, not likely to leak and which requires very little force for its actuation, and on the other hand to provide a valve actuating mechanism which is automatic in its operation and effective to open and close an associated valve instantaneously, and which moreover is of relatively simple, inexpensive construction, strong, durable and thoroughly reliable and efficient in use.

With the foregoing and other purposes in view, my invention consists in the novel features of construction, combination and arrangement of parts as will be hereinafter more fully described, illustrated in the accompanying drawings and defined in the appended claims.

In the drawings, wherein like characters of reference denote corresponding parts in the different views:—

Figure 2:
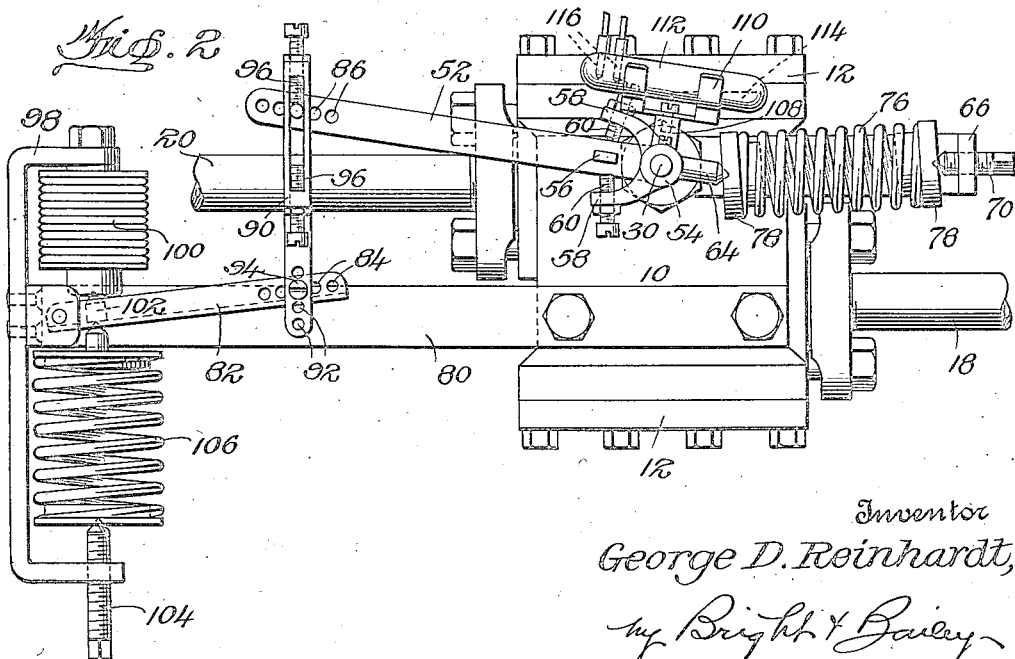

Figure 1 is a vertical section through a valve embodying my improvements and which is of a type adapted to be actuated by my improved valve actuating mechanism, said section being taken approximately on the line 1—1 of Fig. 3;

Figure 2, a front elevation of my improved valve actuating mechanism showing same operatively associated with a valve of the type shown in Figure 1, the parts being in the position they occupy when, for example, the valve is closed;

Figure 3, a horizontal section through my improved valve showing my improved valve actuating mechanism operatively associated therewith, my valve actuating mechanism being shown in top plan view;

Figure 4, a view similar to Figure 2 showing the status of the parts of my valve actuating mechanism when, for example, the valve is open;

Figure 5, a detail perspective view of one of the elements of my improved valve actuating mechanism;

Figure 6, a detail perspective view of another of the elements of my improved valve actuating mechanism; and Figure 7, a detail perspective of still another of the elements of my improved valve actuating mechanism.

Referring to the drawings in detail, it will be observed that my improved valve consists essentially of a casing 10 provided with end plates 12, 12 which, desirably, are removable whereby access may be had to the interior of said casing. A partition 14 divides said casing into two separate compartments 16, 16 and, as shown, said compartments have connected therewith, respectively, inlet and outlet pipes 18, 20. Formed through the partition 14 is a pair of spaced ports 22, 24 and associated with said ports for opening and closing them is a pair of valves 26, 28 of the puppet type, one of which seats against one side of said partition while the other seats against the opposite side thereof, both valves preferably being provided with guide ribs cooperating with the walls of their related ports.

A rock shaft 30 extends from the exterior of casing 10 through a packing gland in one side wall thereof into one of the compartments 16 and takes bearing at its inner end in the opposite side wall of said casing, said shaft, interiorly of said casing, having mounted thereon a lever 32 composed of two pairs of spaced arms 34, 36 extending in opposite directions therefrom, the arms 34 having rockably mounted therebetween a block 38, and the arms 36 likewise having rockably mounted therebetween a block 40. Valve 26 which seats against the side of the partition 16 remote from shaft 30 has its stem extending loosely through the block 38 while valve 28 which seats against the side of the partition 16 adjacent to shaft 30 has its stem extending loosely through the block 40. A nut 42 threaded on the stem of valve 26 between said valve and the block 38 constitutes an adjustable abutment adapted to be engaged by the block 38 when the shaft 30 is rocked in one direction to effect opening movement of said valve, while a coil spring 44 surrounding the stem of said valve between the block 38 and a nut 46 on the outer end portion of the stem serves to maintain said valve yieldably closed when the shaft 30 is rocked in the other direction. On the stem of valve 28 is provided a pair of abutments 48, 50, one in engagement with one side and the other in engagement with the opposite side of block 40, whereby said valve 28 is opened and closed in harmony with valve 26 by rocking movements of shaft 30.

By reason of the foregoing arrangement it is apparent that any pressure of fluid present in the compartments 16, 16 will act with substantially the same force upon the valves 26, 28 tending to open one and close the other with the result that said valves substantially balance one another and as a consequence require only a very slight force to open and close them.

On the shaft 30 is loosely mounted for rotation with respect thereto a lever member 52, while fixed to said shaft for rotation therewith is a lever member 54. Lever member 52 has a lug 56 projecting laterally therefrom while lever member 54 is inclusive of a pair of spaced arms 58, 58 disposed to opposite sides of lug 56 and in the path of movement thereof, said arms being provided with adjustment screws 60, 60 one of which is adapted to be engaged by lug 56 when lever member 52 is swung in one direction to cause the shaft 30 to be kicked or rocked in a direction to produce closing movement of the valves 26, 28, and the other of which is adapted to be engaged by said lug when the lever member 52 is swung in the other direction to cause the shaft 30 to be kicked or rocked in a direction to produce opening movement of the valves 26, 28. Extending radially from the hub of lever member 52 is a pin 62, while projecting radially from the hub of lever member 54 is a pin 64. An arm 66 bolted or otherwise mounted on valve casing 10 has its free end portion bent to extend parallel with shaft 30, and threaded in the free end portion of said arm is a pair of pins 68, 70. A coil spring 72 provided at its ends with blocks 74, 74 is arranged in compression between the pins 62 and 68, the pin 62 seating at its free end in a recess in the center of one of said blocks and the pin 68 seating at its end adjacent to the spring in a recess in the center of the other of said blocks. A second coil spring 76 provided at its ends with blocks 78, 78 is arranged in compression between the pins 64, 70, the pin 64 seating at its free end in a recess in the center of one of said blocks and the pin 70 seating at its end adjacent to the spring in a recess in the center of the other of said blocks. As a consequence of this arrangement it is apparent that with the lever members 52, 54 in the position shown in Figure 2, in which position the valves 26, 28 are closed, the spring 76 acts to maintain a force on pin 64 tending to rock shaft 30 in a direction to hold the valves closed and the spring 72 acts to maintain a force on pin 62 tending to hold said lever member 52 in the position illustrated. If now lever member 52 is swung downward from the position it occupies in Figure 2, spring 72 will resist such downward movement until the pin 62 becomes alined with pin 68 and upon slight further downward movement of said lever member, sufficient to disaline said pins, spring 72 then will act to kick or rotate said lever member quickly to the position shown in Fig. 4. The spacement of the adjusting screws 60, 60 with respect to lug 56 is such that said lug engages the screw 60 carried by the lowermost arm 58 as viewed in Figure 2, only after the spring 72 begins to act to kick said lever member 52 towards the position shown in Fig. 4, the consequence being that during slightly more than one-half of the downward movement of lever member 52 from the position shown in Fig. 2 to the position shown in Fig. 4 no movement of lever member 54 or of shaft 30 occurs, but after said lever 52 has moved downward slightly more than one-half of its movement from the position of Fig. 2 to the position of Fig. 4 the lug 56 then engages the lower pin 60 under the influence of the kick imparted to lever member 52 by spring 72 and gives the lever member 54 a kick sufficient to overcome the holding force of spring 76 and in a direction to rotate the freely rockable shaft 30 to open the valves 26, 28, the spring 76 then acting because of the reversed position of the pin 64 to maintain a force through said pin to hold the valves open. With the lever members 52, 54 in the position shown in Fig. 4, exactly the reverse of the operation just stated secures return of the parts to the position of Fig. 2, it thus being apparent that lever member 52 is capable of being moved gradually from its position shown in either of Figures 2 or 4 towards its position shown in the other of said figures without affecting the valves 26, 28 until said lever member reaches a predetermined position, whereupon the valves are either opened or closed instantaneously.

A second arm 80 is bolted or otherwise suitably mounted on the valve casing 10 and has pivoted thereto at its free end a lever member in the form of a plate 82 having formed therein at its free end a series of holes 84. The free end of lever member 52 is likewise provided with a series of holes 86 through a selected one of which is engaged a pin 88. A link 90 is provided at one end with a series of holes 92 through any one of which a pivot pin 94 is adapted to be passed and engaged in any one of the holes 84 in the plate 82. The opposite end portion of link 90 is slotted to receive the pin 88, the ends of said slot being constituted by screws 96, 96 threaded into the link 90 and the length of said slot being determined by the adjustment of said screws, as is manifest. For proper operation of the mechanism the distance between the adjacent ends of the screws 96, 96 is slightly less than one-half of the swinging movement of lever 52 between its positions shown in Figures 2 and 4.

A bracket 98 is rigidly secured to arm 80 and upon this bracket is mounted an expansible and contractile bellows diaphragm 100 one end of which engages a pin 102 projecting from one face of the plate 82. An adjustment screw 104 is threaded into said bracket 98 and between said screw and the other face of plate 82 is arranged a coil spring 106 the function of which is to urge the plate 82 and consequently the lever arm 52 constantly towards the position of these parts shown in Figure 2 in which position of said parts the valves 26, 28 are closed as aforesaid. The function of the bellows diaphragm 100 on the other hand is, upon expansion thereof, which expansion may be produced by pressure or rising temperature or in any other desired manner to swing the plate 82 towards the position of Fig. 4 against the force of spring 106, thereby to cause the mechanism to produce opening movement of the valve in the manner aforestated.

A lug 108 is formed on lever member 54 and to this lug is fastened a bracket 110 which supports an electric switch of any suitable type which will be opened by rocking movement of said lever member to the position of Fig. 2 and closed by rocking movement of said lever member to the position of Fig. 4, said switch preferably consisting of a tube 112 in which is disposed a small amount of mercury 114 which, in the position of the tube shown in Fig. 2, flows to one end of the tube and breaks contact between a pair of circuit terminal members 116, and, in the position of the tube shown in Fig. 4, flows to the other end of the tube and bridges the terminal members 116, closing the circuit through said members.

My invention is capable of use in any capacity where it is desired that a valve shall be opened and closed automatically due to variations in temperature, pressure or to other causes. It is particularly useful in association with refrigerating apparatus for controlling the flow of refrigerating fluid through the apparatus in accordance with changes in temperature and when adapted to such use the bellows diaphragm 100 will desirably but not necessarily be thermally operated. Assuming the valve to be located in the refrigerant line of a refrigerating apparatus with the parts in the position of Fig. 2 and the valve closed cutting off communication between the pipes 18, 20, a rise in temperature will cause the bellows diaphragm 100 to expand, that is, increase in length, with the result that the lever member 52 will be moved gradually from the position of Fig. 2 towards the position of Fig. 4. Since, however, said lever member 52 is loose on shaft 30 and since the screws 60 normally are spaced from the lug 56, such movement of lever 52 is ineffective to actuate any other part of the mechanism until said lever moves slightly beyond a position in which the pins 62, 68 are alined with one another, whereupon, as aforestated, the spring 72 acts to kick said lever quickly to the position of Fig. 4, during which movement the lug 56 engages the lowermost pin 60 as viewed in Fig. 2 with the result that lever member 54 is given a kick from the position of Fig. 2 to the position of Fig. 4 in which latter position it is held by the spring 76. Lever member 54 being fixed to shaft 30 rotates said shaft to open the valve, allowing the refrigerating fluid to flow through the apparatus and effect a reduction in temperature whereupon the bellows diaphragm contracts and spring 106 moves lever member 52 from the position of Fig. 4 slowly towards the position of Fig. 2 with the result that as said lever member completes slightly more than one-half of its movement the spring 72 kicks it to the extreme position of Fig. 2 and just the reverse of the operation described is effected with consequent movement of the valve to closed position.

The switch carried by lever member 54 is intended, when the mechanism is used in association with a refrigerating apparatus, to open and close the circuit to a motor which operates the compressor or equivalent unit of such apparatus, so that the compressor will be started when the valve is opened and stopped when the valve is closed. Manifestly, however, said switch may be used to open and close any circuit in harmony with opening and closing movements of the valve.

The screws 60, 60 and 96, 96 together with the different series of openings 84, 86 and 92 provide for various adjustments of the mechanism to cause the valve to be opened and closed by either a small or a large amount of movement of the bellows diaphragm 100 or equivalent device, while the screws 68, 70 and 104 provide as is manifest for adjusting springs 72, 76 and 106 to cause them to have the proper force to actuate the mechanism efficiently. Moreover, as is further manifest, my improved valve may be actuated by an automatic mechanism specifically different from the mechanism herein shown, and my automatic mechanism may be used for the operation not only of valves, but of various other devices.

From the foregoing description considered in connection with the accompanying drawings it is believed that the construction, operation and advantages of my invention will be fully understood. I desire to point out, however, that various changes and desirable additions may be made in and to the structure shown within the spirit and scope of my invention as defined in the appended claims.

I claim:

1. In mechanism of the class described, a shaft rotatable between two positions, a pin rigid with and extending radially with respect to said shaft, a spring support located in alinement with said pin when the latter is midway between its limits of movement as determined by the two positions of said shaft, a spring between said pin and said support whereby it is operable to hold said shaft in either of its two positions, a member movable with respect to said shaft, and a lost motion connection between said member and said shaft.

2. In mechanism of the class described, a shaft rotatable between two positions, a pin rigid with and extending radially with respect to said shaft, a spring support located in alinement with said pin when the latter is midway between its limits of movement as determined by the two positions of said shaft, a spring between said pin and said support whereby it is operable to hold said shaft in either of its two positions, a member on and rotatable with respect to said shaft between two positions, a pin rigid with said member and extending radially with respect to said shaft, a spring support located in alinement with said second mentioned pin when the latter is midway between its limits of movement as determined by the two positions of said member, a spring between said second mentioned pin and said second mentioned support, and a lost motion connection between said member and said shaft.

3. In mechanism of the class described, a shaft rotatable between two positions, a member fixed to said shaft, a member movable with respect to said shaft, a lost motion connection between said members, spring means for moving said members, a lever arm extending from said second mentioned member, a slotted link, a pin on said lever arm engaged within the slot in said link, a pivoted lever, a connection between said link and said lever, a spring in engagement with one side of said lever constantly urging said lever in one direction, and an expansible and contractile member operating against the other side of said lever.

In testimony whereof I hereunto affix my signature.

G. D. REINHARDT.